(12) United States Patent
Iyer et al.

(10) Patent No.: US 11,593,125 B2
(45) Date of Patent: Feb. 28, 2023

(54) ADJUSTING WIRELESS DOCKING RESOURCE USAGE

(71) Applicant: Dell Products L.P., Round Rock, TX (US)

(72) Inventors: Vivek Viswanathan Iyer, Austin, TX (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 360 days.

(21) Appl. No.: 16/997,583

(22) Filed: Aug. 19, 2020

(65) Prior Publication Data

US 2022/0058035 A1   Feb. 24, 2022

(51) Int. Cl.

| | |
|---|---|
| *G06F 9/445* | (2018.01) |
| *G06F 13/40* | (2006.01) |
| *H04W 28/10* | (2009.01) |
| *G06V 40/10* | (2022.01) |
| *G06V 40/20* | (2022.01) |
| *H04N 5/33* | (2006.01) |
| *G06F 1/32* | (2019.01) |

(52) U.S. Cl.
CPC ...... *G06F 9/44505* (2013.01); *G06F 13/4063* (2013.01); *H04W 28/10* (2013.01); *G06F 1/32* (2013.01); *G06V 40/10* (2022.01); *G06V 40/20* (2022.01); *H04N 5/33* (2013.01)

(58) Field of Classification Search
CPC ............. G06F 9/44505; G06F 13/4063; G06F 1/3231; G06F 1/3287; G06F 1/3293; G06F 1/324; G06F 1/3237; G06F 1/3234; G06F 1/32; G06V 40/10; G06V 40/20

USPC .................................................. 713/320–324
See application file for complete search history.

(56) References Cited

U.S. PATENT DOCUMENTS

| | | | | |
|---|---|---|---|---|
| 8,254,992 | B1 * | 8/2012 | Ashenbrenner ....... | G06F 1/1632 455/41.3 |
| 9,131,335 | B2 * | 9/2015 | Huttunen .................. | H04B 7/26 |
| 9,338,268 | B2 * | 5/2016 | Holtman .................. | H04M 1/04 |
| 10,009,899 | B2 * | 6/2018 | Walline .................. | H04W 12/06 |
| 10,070,098 | B2 * | 9/2018 | Vitta ....................... | H04W 4/80 |
| 10,088,869 | B2 * | 10/2018 | Dees ..................... | G06F 1/1632 |
| 10,194,478 | B2 * | 1/2019 | Lee ................... | H04M 1/72412 |

(Continued)

*Primary Examiner* — Brian T Misiura
(74) *Attorney, Agent, or Firm* — McDermott Will & Emery LLP

(57) ABSTRACT

Adjusting wireless docking resource usage, including identifying, at a client information handling system (IHS), a configuration policy, the client IHS wirelessly connected to a docking station, the docking station providing wireless connections to peripheral computing components, respectively; processing, at the client IHS, the configuration policy, including identifying configuration rules of the configuration policy for performing computer-implemented actions of throttling resource utilization between the client IHS and the docking station; identifying, at the client IHS, when the client IHS is wirelessly connected to the docking station, a first presence state of a user with respect to the client IHS; and determining, at the client IHS, that the first presence state indicates that the user of the client IHS is not actively engaged with the client IHS, and in response, applying the configuration rules to perform computer-implemented actions of throttling resource utilization between the client IHS and the docking station.

19 Claims, 4 Drawing Sheets

(56) References Cited

U.S. PATENT DOCUMENTS

| | | | | |
|---|---|---|---|---|
| 10,429,890 | B2* | 10/2019 | Israeli | H04W 52/0254 |
| 10,585,815 | B2* | 3/2020 | Hall | G06F 1/1632 |
| 11,269,391 | B2* | 3/2022 | Iyer | G06F 1/3206 |
| 11,314,311 | B2* | 4/2022 | Iyer | G06V 40/10 |
| 2018/0321731 | A1* | 11/2018 | Alfano | G06F 1/3287 |
| 2020/0053651 | A1* | 2/2020 | Lee | G06F 3/16 |
| 2021/0109486 | A1* | 4/2021 | Hamlin | G01S 17/04 |
| 2021/0240842 | A1* | 8/2021 | Hamlin | G06F 1/3203 |

* cited by examiner

ADJUSTING WIRELESS DOCKING RESOURCE USAGE

BACKGROUND

Field of the Disclosure

The disclosure relates generally to an information handling system, and in particular, adjust wireless docking resource usage between the information handling system and a docking station.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method for adjusting wireless docking resource usage, including identifying, at a client information handling system (IHS), a configuration policy, the client IHS wirelessly connected to a docking station, the docking station providing one or more wireless connections to one or more peripheral computing components, respectively; processing, at the client IHS, the configuration policy, including identifying one or more configuration rules of the configuration policy for performing computer-implemented actions of throttling resource utilization between the client IHS and the docking station; identifying, at the client IHS, when the client IHS is wirelessly connected to the docking station, a first presence state of a user with respect to the client IHS; and determining, at the client IHS, that the first presence state indicates that the user of the client IHS is not actively engaged with the client IHS, and in response, applying one or more of the configuration rules to perform computer-implemented actions of throttling resource utilization between the client IHS and the docking station.

Other embodiments of these aspects include corresponding systems, apparatus, and computer programs, configured to perform the actions of the methods, encoded on computer storage devices.

These and other embodiments may each optionally include one or more of the following features. For instance, identifying, at the client IHS, when the client IHS is wirelessly connected to the docking station, a second presence state of the user with respect to the client IHS; and determining, at the client IHS, that the second presence state indicates that the user of the client IHS is actively engaged with the client IHS, and in response, ceasing throttling resource utilization between the client IHS and the docking station. Identifying, at the docking station, an additional configuration policy; processing, at the docking station, the additional configuration policy, including identifying one or more additional configuration rules of the additional configuration policy for performing computer-implemented actions of throttling resource utilization between the client IHS and the docking station; identifying, at the docking station, when the client IHS is wirelessly connected to the docking station, the first presence state of the user with respect to the IHS; and determining, at the docking station, that the first presence state indicates that the user of the client IHS is not actively engaged with the client IHS, and in response, applying one or more of the additional configuration rules to perform computing-implemented actions of throttling resource utilization between the client IHS and the docking station. The configuration policy further indicates two or more time thresholds associated with the configuration rules for performing the computer-implemented actions of throttling resource utilization between the client IHS and the docking station, wherein identifying, when the client IHS is wirelessly connected to the docking station, the first presence state of the user with respect to the client IHS includes identifying the first presence state of the user with respect to the client IHS for a first time amount, the method further including comparing the first time amount to a first time threshold of the configuration policy; determining that the first time amount is greater than the first time threshold; identifying a particular configuration rule of the configuration rules corresponding to i) identification of the first presence state and ii) determining that the first time amount greater than the first time threshold; and applying the particular configuration rule including performing a first subset of the computer-implemented actions to throttle resource utilization between the client IHS and the docking station. The configuration policy further indicates two or more location parameters associated with the configuration rules for performing the computer-implemented actions of throttling resource utilization between the client IHS and the docking station, wherein identifying, when the client IHS is wirelessly connected to the docking station, the first presence state of the user with respect to the client IHS includes identifying the first presence state of the user with respect to the client IHS at a first location, the method further including identifying a particular configuration rule of the configuration rules corresponding to i) the identification of the first presence state and ii) the identification of the first location; and applying the particular configuration rule including performing a first subset of the computer-implemented actions to throttle resource utilization between the client IHS and the docking station. Identifying, when the client IHS is wirelessly connected to the docking station, the first presence state of the user with respect to the client IHS includes utilizing an infrared camera to detect the presence of the user. Identifying, when the client IHS is wirelessly connected to the docking station, the first presence state of the user with respect to the client IHS includes utilizing a camera to detect the presence of the user. Identifying, when the client IHS is wirelessly connected to the docking station, the first presence state of the user with respect to the client IHS includes utilizing an audio detector to detect the presence of the user. Receiving the configuration policy from a server information handling system. The configuration rules are further for performing computer-implemented actions of throttling resource utilization at the client IHS and the docking station, the method further comprising applying the one or more of the configuration rules to perform computer-implemented actions of throttling resource utilization at the client IHS and the docking station. Performing the computer-implemented actions of throttling resource utilization between the client IHS and the docking station includes one or more of reducing wireless traffic between the client IHS and the docking station, changing a power state of a display of the client IHS, and reducing a graphic fidelity of the display of the client IHS.

The details of one or more embodiments of the subject matter described in this specification are set forth in the accompanying drawings and the description below. Other potential features, aspects, and advantages of the subject matter will become apparent from the description, the drawings, and the claims.

Figure 1:
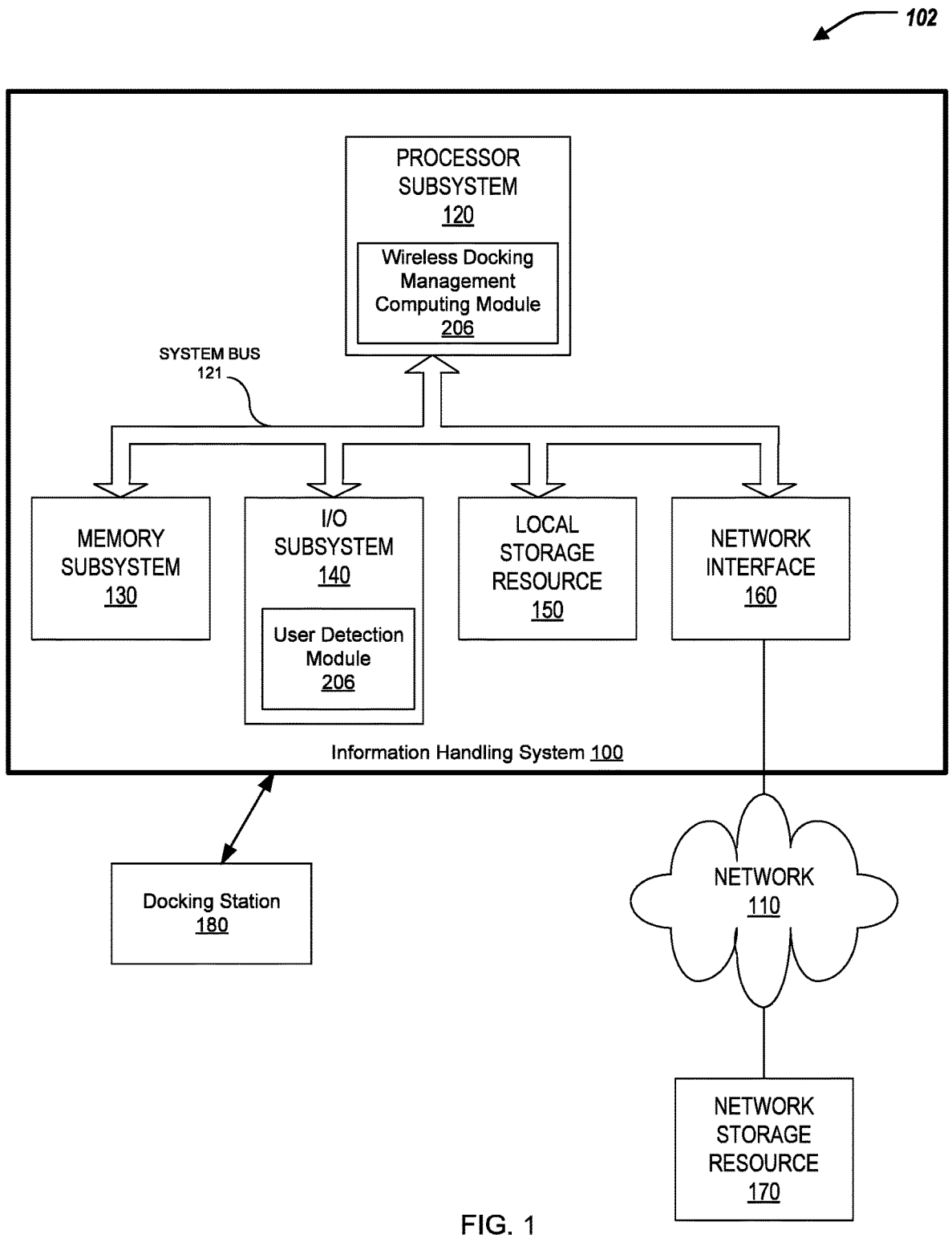
FIG. 1 is a block diagram of selected elements of an embodiment of an information handling system.

DESCRIPTION OF PARTICULAR
EMBODIMENT(S)

This disclosure discusses methods and systems for adjusting wireless dock usage between an information handling system and a docking station. Specifically, docking stationing of an information handling system to a docking station can provide flexibility in connecting peripherals (such as a keyboard, mouse, display) to the information handling system. When a user of the information handling system is not present at the information handling system (e.g., engaged with the information handling system) while the information handling system is wirelessly docked to the docking station, computing resources can be throttled to conserve such resources and to improve overall device and network resource utilization.

Specifically, this disclosure discusses receiving, at a client information handling system (IHS), a configuration policy from a server information handling system, the client IHS wirelessly connected to a docking station, the docking station providing one or more wireless connections to one or more peripheral computing components, respectively; processing, at the client IHS, the configuration policy, including identifying one or more configuration rules of the configuration policy for performing computer-implemented actions of throttling resource utilization at the client IHS, at the docking station, and between the client IHS and the docking station; identifying, at the client IHS, when the client IHS is wirelessly connected to the docking station, a first presence state of the user with respect to the client IHS; and determining, at the client IHS, that the first presence state indicates that the user of the client IHS is not actively engaged with the client IHS, and in response, applying one or more of the configuration rules to perform computer-implemented actions of throttling resource utilization at the client IHS, at the docking station, and between the client IHS and the docking station.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting a computing environment 102 including selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a wireless docking management computing module 190. The wireless docking management computing module 190 can be included by the processor subsystem 120. The information handling system 100 can also include a user detection module 192. The user detection module 192 can be included by the I/O subsystem 140.

The environment 102 can further include a docking station 180. The docking station 180 provides a wireless connection to computing peripherals to the information handling system 100 when the information handling system 100 is wireless connected (docked) to the docking station 180.

In short, wireless docking of the information handling system 100 to the docking station 180 can provide flexibility in connecting peripherals (such as a keyboard, mouse, display) to the information handling system 100. When a user of the information handling system 100 is not present at the information handling system 100 (engaged with the information handling system 100) while the information handling system 100 is wirelessly docked to the docking station 180, computing resources can be throttled to conserve such resources and to improve overall device and network resource utilization based on the context of the user, the information handling system 100, and the docking station 180.

Figure 2:
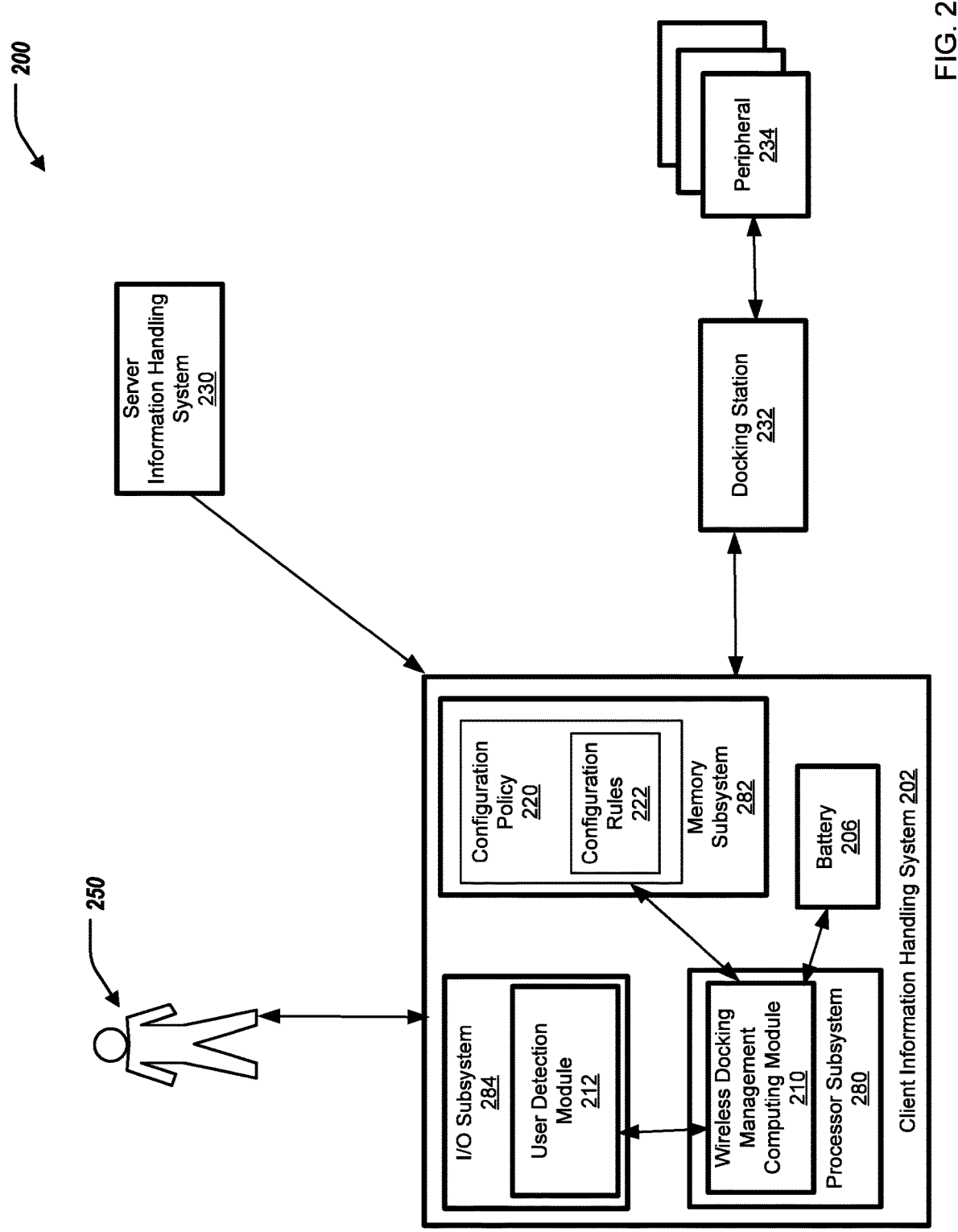
FIG. 2 illustrates a block diagram of an information handling system for adjusting wireless dock usage between the information handling system and a docking station.

Turning to FIG. 2, FIG. 2 illustrates a computing environment 200 including a client information handling system (IHS) 202, a server information handling system (IHS) 230, a docking station 232, and peripherals 234. The client IHS 202 may be in communication with the server IHS 230 and the docking station 232. In short, the client IHS 202 can access the peripherals 234 through the docking station 232. The client IHS 202 can be wirelessly connected to the docking station 232, e.g., using one or more wireless communication standards (Wi-Fi, Bluetooth, other).

The docking station 232 can provide access to the peripherals 234 when the client IHS 202 is wireless connected to the docking station 232. Specifically, the peripherals 234 can be connected, wirelessly and or wired, to the docking station 232. For example, the peripherals 234 can include a display, a keyboard, a mouse, a printer, and other similar peripheral devices. When the client IHS 202 is wirelessly connected to the docking station 232, the client IHS 202 is able to access the peripherals 234 such that client IHS 202 can interact with the peripherals 234, e.g., by a user 250 of the client IHS 202.

The information handling system 202 can include a processor subsystem 280, a memory subsystem 282, an I/O subsystem 284, and a battery 206. The processor subsystem 280 can be similar to the processor subsystem 120 of FIG. 1; the memory subsystem 282 can be similar to the memory subsystem 130 of FIG. 1; and the I/O subsystem 284 can be similar to the I/O subsystem 140 of FIG. 1. The processor subsystem 280 can include a wireless docking management computing module 210; and the I/O subsystem 284 can include a user detection module 212. The wireless docking management computing module 210 can be in communication with the user detection module 212 and the battery 206. In some examples, the wireless docking management computing module 210 is the same, or substantially the same, as the wireless docking management computing module 190 of FIG. 1. In some examples, the user detection module 212 is the same, or substantially the same, as the user detection module 192 of FIG. 1.

In some examples, the docking station 232 is the same, or substantially the same, as the docking station 180 of FIG. 1.

In some implementations, the client IHS 202 can receive a configuration policy 220 from the server IHS 230, e.g., over one or more networks. The client IHS 202 can store the configuration policy 220 in the memory subsystem 282. The wireless docking management computing module 210 can process the configuration policy 220 to identify configuration rules 222. The configuration rules 222 are rules for performing computer-implemented actions of throttling resource utilization at the client IHS 202, at the docking station 232, and/or between the client IHS 202 and the docking station 232.

For example, the configuration rules 222 can include reducing wireless traffic between the client IHS 202 and the docking station 232 to throttle resource utilization between the client IHS 202 and the docking station 232. The configuration rules 222 can include changing a power state of a peripheral 234. That is, the configuration rules 222 can include changing the power state of the peripheral 234 to a low-power state, or no-power state. For example, when the peripheral 234 includes a display (computer monitor), the configuration rules 222 can include changing the power state of the display—from a "normal" operating power state to a low-power state, or a no-power state. The configuration rules 222 can include reducing a processing performance of a peripheral 234. For example, when the peripheral 234 includes a display (computer monitor), the configuration rules 222 can include changing the processing performance of the display—from a "normal" processing performance state to a reduced graphic fidelity state of the display.

The user detection module 212 can detect a presence state of the user 250 with respect to the client IHS 202. The presence state of the user 250 can include i) that the user 250 is actively engaged with the client IHS 202 or ii) that the user 250 is not actively engaged with the client IHS 202. The user detection module 212 can detect the presence state of the user 250 with respect to the client IHS 202 utilizing a variety of detection methods.

For example, the user detection module 212 can include an infrared (time-of-flight) camera (or RADAR/LIDAR sensor) to facilitate detection of the presence state of the user 250. That is, the infrared camera (or RADAR/LIDAR sensor) can generate a three-dimensional map of the user 250 and transmit the same to the wireless docking management computing module 210 for processing. The wireless docking management computing module 210 can determine, based on the three-dimensional map provided by the infrared camera (or RADAR/LIDAR sensor), the presence state of the user 250. The wireless docking management computing module 210 can process the three-dimensional map of the user 250, and determine that the user 250 is present and actively engaged with the client IHS 202 (e.g., the user 250 is facing the client IHS 202); or determine that the user 250 is not present (e.g., the user 250 is stepped away from the client IHS 202). In some examples, the wireless docking management computing module 210 can process the three-dimensional map of the user 250, and determine that the user 250 is present but not actively engaged with the client IHS 202 (e.g., the user 250 is not facing the client IHS 202).

For example, the user detection module 212 can include an image/video camera (or an infrared camera) to facilitate detection of the presence state of the user 250. That is, the image/video camera (or infrared camera) can generate a two-dimensional image/video of the user 250 and transmit the same to the wireless docking management computing module 210 for processing. The wireless docking management computing module 210 can determine, based on the two-dimensional image/video provided by the image/video camera (or infrared camera), the presence state of the user 250 (e.g. utilizing image recognition/processing through machine learning, and/or neural networks). The wireless docking management computing module 210 can process the two-dimensional image/video of the user 250, and determine that the user 250 is present and actively engaged with the client IHS 202 (e.g., the user 250 is facing the client IHS 202); or determine that the user 250 is not present (e.g., the user 250 is stepped away from the client IHS 202). In some examples, the wireless docking management computing module 210 can process the two-dimensional image/video of the user 250, and determine that the user 250 is present but not actively engaged with the client IHS 202 (e.g., the user 250 is not facing the client IHS 202).

For example, the user detection module 212 can include an audio detector (microphone) to facilitate detection of the presence state of the user 250. That is, the audio detector can generate an audio recording of the user 250 and transmit the same to the wireless docking management computing module 210 for processing. The wireless docking management computing module 210 can determine, based on the audio recording provided by audio detector, the presence state of the user 250 (e.g. utilizing audio recognition/processing through machine learning, and/or neural networks). The wireless docking management computing module 210 can process the audio recording of the user 250, and determine that the user 250 is present (e.g., the user 250 is making sounds consistent with being engaged with the client IHS 202— keyboard clicks and/or mouse clicks); or determine that the user 250 is not present (e.g., the user 250 is not making sounds consistent with being engaged with the client IHS 202).

For example, the user detection module 212 can include a Bluetooth sensor to facilitate detection of the presence state of the user 250. That is, the Bluetooth sensor can generate a signal indicating a presence (or non-presence) of a Bluetooth device associated with the user (e.g., a smartphone) to facilitate detection of the presence state of the user 250. The wireless docking management computing module 210 can determine, based on the Bluetooth signal provided by Bluetooth sensor, the presence state of the user 250. The wireless docking management computing module 210 can process the Bluetooth signal associated with the user 250, and determine that the user 250 is present (e.g., the Bluetooth signal indicates that the user 250 is proximate to the IHS 202); or determine that the user 250 is not present (e.g., the Bluetooth signal indicates that the user 250 is not proximate to the IHS 202).

In some examples, the user detection module 212 can include multiple types of user presence state detection apparatuses. For example, the user detection module 212 can include any combination of the infrared camera, RADAR/LIDAR sensor, the image/video camera, the infrared camera, the Bluetooth sensor, and the audio detector to facilitate detection of the presence state of the user 250.

The wireless docking management computing module 210 can determine that the presence state indicates that the user 250 is not actively engaged with the client IHS 202. For example, based on the three-dimensional map of the user 250, the two-dimensional image/video of the user 250, and/or the audio recording of the user 250, the wireless docking management computing module 210 can determine that the presence state indicates that the user 250 is not actively engaged with the client IHS 202.

In response to determining that the presence state indicates that the user 250 is not actively engaged with the client IHS 202, the wireless docking management computing module 210 can apply one or more of the configuration rules 222 to perform computer-implemented actions of throttling resource utilization at the client IHS 202, at the docking station 232, and/or between the client IHS 202 and the docking station 232. Specifically, the wireless docking management computing module 210 can access the configuration policy 220 and identify the particular configuration rule 222 (or rules 222) that are associated with the determination that the presence state indicates that the user 250 is not actively engaged with the client IHS 202. The wireless docking management computing module 210 can then apply the particular configuration rule 222 (or rules 222) to perform computer-implemented actions of throttling resource utilization at the client IHS 202, at the docking station 232, and/or between the client IHS 202 and the docking station 232.

For example, the wireless docking management computing module 210, in response to determining that the presence state indicates that the user 250 is not actively engaged with the client IHS 202, can access the configuration policy 220 and identify the particular configuration rule 222 to reduce wireless traffic between the client IHS 202 and the docking station 232. The wireless docking management computing module 210 can apply the configuration rule 222 of reducing wireless traffic between the client IHS 202 and the docking station 232 to throttle resource utilization between the client IHS 202 and the docking station 232.

For example, the wireless docking management computing module 210, in response to determining that the presence state indicates that the user 250 is not actively engaged with the client IHS 202, can access the configuration policy 220 and identify the particular configuration rule 222 to change the power state of the peripheral 234 to a low-power state, or no-power state. The wireless docking management computing module 210 can apply the configuration rule 222 of changing the power state of the peripheral 234 to a low-power state, or no-power state, to throttle resource utilization at the client IHS 202. For example, when the peripheral 234 includes a display (computer monitor), the configuration rules 222 can include changing the power state of the display—from a "normal" operating power state to a low-power state, or a no-power state.

For example, the wireless docking management computing module 210, in response to determining that the presence state indicates that the user 250 is not actively engaged with the client IHS 202, can access the configuration policy 220 and identify the particular configuration rule 222 to reduce a processing performance of a peripheral 234. The wireless docking management computing module 210 can apply the configuration rule 222 of reducing a processing performance of a peripheral 234 to throttle resource utilization at the client IHS 202. For example, when the peripheral 234 includes a display (computer monitor), the configuration rules 222 can include changing the processing performance of the display—from a "normal" processing performance state to a reduced graphic fidelity state of the display.

In a use case example, the user 250 is engaged with the client IHS 202 that is wirelessly connected to the docking station 232 ("wirelessly docked"). However, the client IHS 202 is not connected to AC power (the client IHS 202 is relying on the battery 206 for power). The user 250 is downloading a large file at the client IHS 202 over a network connection utilizing the docking station 232. The user 250 steps away from the client IHS 202, and is not actively engaged with the client IHS 202. The wireless docking management computing module 210, based on data received from the user detection module 212, can determine that the presence state of the user 250 indicates that the user 250 is not actively engaged with the client IHS 202. In response, the wireless docking management computing module 210 can apply configuration rules to reduce wireless traffic between the client IHS 202 and the docking station 232 to throttle resource utilization between the client IHS 202 and the docking station 232, and conserve charge at the battery 206.

In a use case example, the user 250 is engaged with the client IHS 202 that is wirelessly connected to the docking station 232 ("wirelessly docked"). The client IHS 202 is connected through the docking station 232 to peripherals 234 including high-resolution (4K) display devices (monitors) that are executing graphics intensive applications. The user 250 steps away from being engaged with the IHS 202. The wireless docking management computing module 210, based on data received from the user detection module 212, can determine that the presence state of the user 250 indicates that the user 250 is not actively engaged with the client IHS 202. In response, the wireless docking management computing module 210 can apply configuration rules to reduce a processing performance of the display devices (graphic fidelity) to throttle resource utilization at the client IHS 202, the docking station 232, and between the client IHS 202 and the docking station 232.

In some examples, the wireless docking management computing module 210 can determine that the presence state indicates that the user 250 is actively engaged with the client IHS 202. For example, based on the three-dimensional map of the user 250, the two-dimensional image/video of the user 250, and/or the audio recording of the user 250, the wireless docking management computing module 210 can determine that the presence state indicates that the user 250 is actively engaged with the client IHS 202.
In response to determining that the first presence state indicates that the user 250 is actively engaged with the client IHS 202, the wireless docking management computing module 210 can cease throttling resource utilization at the client IHS 202, the docking station 232, and between the client IHS 202 and the docking station 232.

In some examples, the configuration policy 220 can include time thresholds with the configuration rules 222 for performing the computer-implemented actions of throttling resource utilization at the client IHS 202, at the docking station 232, and/or between the client IHS 202 and the docking station 232. To that end, when the client IHS 202 is wirelessly docked to the docking station 232, the user detection module 212 can detect the presence state of the user 250 with respect to the client IHS 202 for a particular time amount. The wireless docking management computing module 210 can compare the first time amount to a particular time threshold of the configuration rules 222, and determine that the particular time amount is greater than the particular time threshold. To that end, in response to determining that the presence state indicates that the user 250 is not actively engaged with the client IHS 202 and that the particular time amount is greater than the particular time threshold, the wireless docking management computing module 210 can identify an associated particular configuration rule 222. The wireless docking management computing module 210 can apply the particular configuration rule 222 including performing a subset of the computer-implemented actions of throttling resource utilization at the client IHS 202, at the docking station 232, and/or between the client IHS 202 and the docking station 232.

In a use case example, the user 250 is engaged with the client IHS 202 that is wirelessly connected to the docking station 232 ("wirelessly docked"). However, the client IHS 202 is not connected to AC power (the client IHS 202 is relying on the battery 206 for power). The user 250 is downloading a large file at the client IHS 202 over a network connection utilizing the docking station 232. The user 250 receives steps away from the client IHS 202, and is not actively engaged with the client IHS 202 for 2 minutes. The wireless docking management computing module 210, based on data received from the user detection module 212, can determine that the presence state of the user 250 indicates that the user 250 is not actively engaged with the client IHS 202 for a first time period greater than a first time threshold (e.g., a time period of 2 minutes greater than a time threshold of 90 seconds). In response, the wireless docking management computing module 210 can apply configuration rules to perform a subset of the computer-implemented actions of throttling resource utilization at the client IHS 202, at the docking station 232, and/or between the client IHS 202 and the docking station 232, including reducing wireless traffic by 50% between the client IHS 202 and the docking station 232.

Additionally, the user 250 can maintain not active engagement with the client IHS 202 now for 10 minutes The wireless docking management computing module 210, based on data received from the user detection module 212, can determine that the presence state of the user 250 indicates that the user 250 is not actively engaged with the client IHS 202 for a second time period greater than a second time threshold (e.g., a time period of 10 minutes greater than a time threshold of 8 minutes). In response, the wireless docking management computing module 210 can apply configuration rules to perform a subset of the computer-implemented actions of throttling resource utilization at the client IHS 202, at the docking station 232, and/or between the client IHS 202 and the docking station 232, including reducing wireless traffic by 75% between the client IHS 202 and the docking station 232.

In some examples, the configuration policy 220 can include location parameters with the configuration rules 222 for performing the computer-implemented actions of throttling resource utilization at the client IHS 202, at the docking station 232, and/or between the client IHS 202 and the docking station 232. To that end, when the client IHS 202 is wirelessly docked to the docking station 232, the user detection module 212 can detect the presence state of the user 250 with respect to the client IHS 202 at a first location. The wireless docking management computing module 210, in response to determining that the presence state indicates that the user 250 is not actively engaged with the client IHS 202 and the identification of the first location, the wireless docking management computing module 210 can identify an associated particular configuration rule 222. The wireless docking management computing module 210 can apply the particular configuration 222 including performing a subset of the computer-implemented actions of throttling resource utilization at the client IHS 202, at the docking station 232, and/or between the client IHS 202 and the docking station 232.

In a use case example, the user 250 is engaged with the client IHS 202 that is wirelessly connected to the docking station 232 ("wirelessly docked"). The client IHS 202 is connected through the docking station 232 to peripherals 234 including high-resolution (4K) display devices (monitors) that are executing graphics intensive applications. The user 250 steps away from being engaged with the IHS 202 and is located at the user's 250 residence. The wireless docking management computing module 210, based on data received from the user detection module 212, can determine that the presence state of the user 250 indicates that the user 250 is not actively engaged with the client IHS 202 and at the user's 250 residence. In response, the wireless docking management computing module 210 can apply configuration rules to perform a subset of the computer-implemented actions of throttling resource utilization at the client IHS 202, at the docking station 232, and/or between the client IHS 202 and the docking station 232, including reducing a processing performance of the display devices (graphic fidelity) by 50% to throttle resource utilization at the client IHS 202, the docking station 232, and between the client IHS 202 and the docking station 232.

In a use case example, the user 250 is engaged with the client IHS 202 that is wirelessly connected to the docking station 232 ("wirelessly docked"). The client IHS 202 is connected through the docking station 232 to peripherals 234 including high-resolution (4K) display devices (monitors) that are executing graphics intensive applications. The user 250 steps away from being engaged with the IHS 202 and is located at a community coffee shop. The wireless docking management computing module 210, based on data received from the user detection module 212, can determine that the presence state of the user 250 indicates that the user 250 is not actively engaged with the client IHS 202 and at the community coffee shop. In response, the wireless docking management computing module 210 can apply configuration rules to perform a subset of the computer-implemented actions of throttling resource utilization at the client IHS 202, at the docking station 232, and/or between the client IHS 202 and the docking station 232, including reducing a processing performance of the display devices (graphic fidelity) by 95% to throttle resource utilization at the client IHS 202, the docking station 232, and between the client IHS 202 and the docking station 232.

Figure 3:
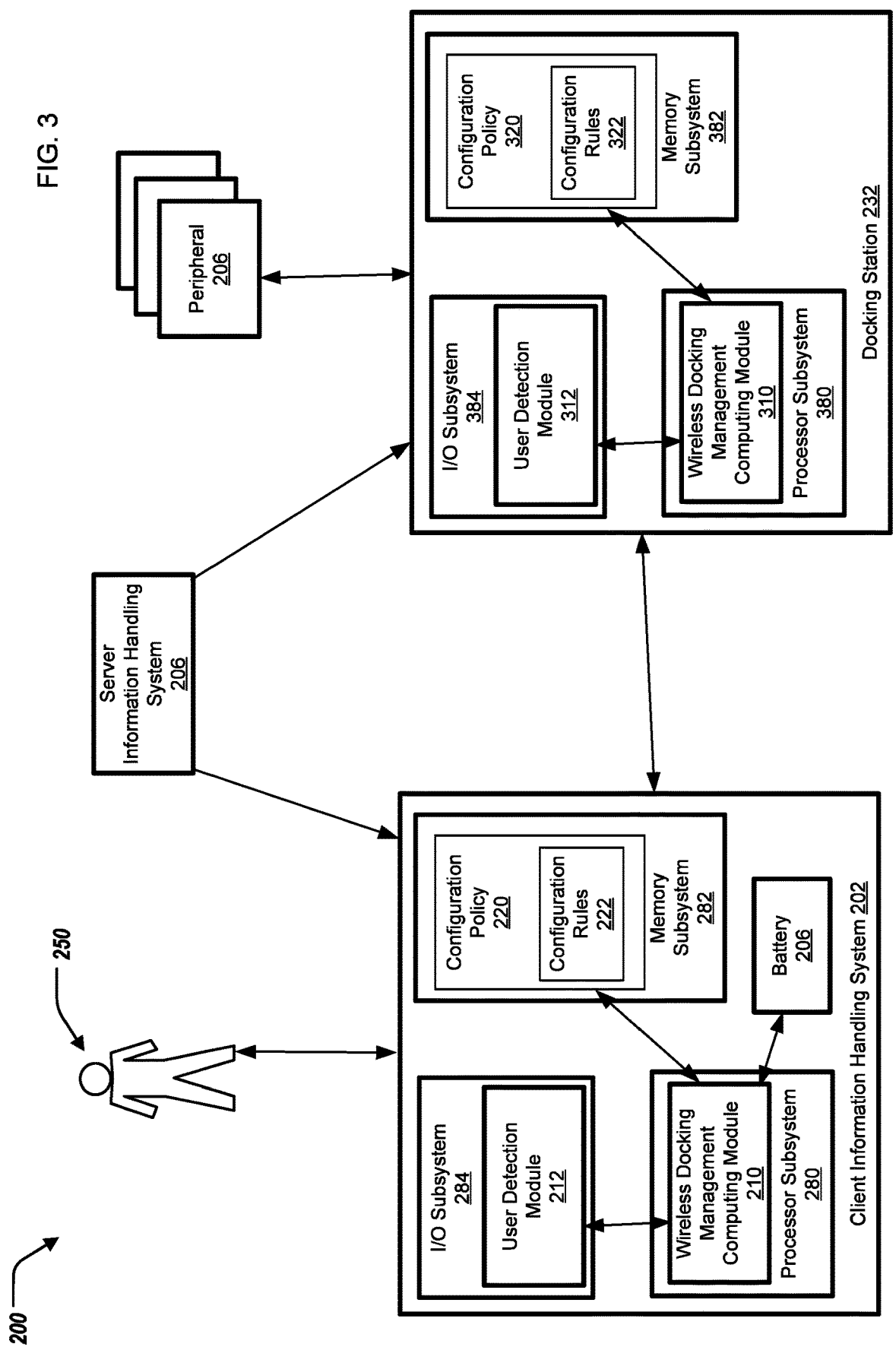
FIG. 3 illustrates a block diagram of an information handling system for adjusting wireless dock usage between the information handling system and a docking station, in a further implementation.

Turning to FIG. 3, FIG. 3 illustrates the computing environment 200, with a further implementation of the docking station 232. The docking station 232 can include a processor subsystem 380, a memory subsystem 382, and an I/O subsystem 384. The processor subsystem 380 can be similar to the processor subsystem 120 of FIG. 1 and/or the processor subsystem 280 of FIG. 2; the memory subsystem 382 can be similar to the memory subsystem 130 of FIG. 1 and/or the memory subsystem 282 of FIG. 2; and the I/O subsystem 384 can be similar to the I/O subsystem 140 of FIG. 1 and/or the I/O subsystem 284 of FIG. 2. The processor subsystem 380 can include a wireless docking management computing module 310; and the I/O subsystem 384 can include a user detection module 312. The wireless docking management computing module 310 can be in communication with the user detection module 312. In some examples, the wireless docking management computing module 310 is similar to the wireless docking management computing module 210 of FIG. 2. In some examples, the user detection module 312 is similar to the user detection module 212 of FIG. 2.

In some implementations, similar to that mentioned above with respect to the client IHS 202 and the configuration policy 220, the docking station 232 can receive an additional configuration policy 320 from the server IHS 230, e.g., over one or more networks. The docking station 232 can store the additional configuration policy 320 in the memory subsystem 382. The wireless docking management computing module 310 can process the additional configuration policy 320 to identify configuration rules 322, similar to the configuration rules 222 of FIG. 2. The configuration rules 322 are rules for performing computer-implemented actions of throttling resource utilization at the client IHS 202, at the docking station 232, and/or between the client IHS 202 and the docking station 232. The docking station 232 can receive the additional configuration policy 320 in coordination with the client IHS 202 receiving the configuration policy 220, or in lieu of the client IHS 202 receiving the configuration policy 220.

Similar to that mentioned above with respect to the client IHS 202, the user detection module 312 can detect a presence state of the user 250 with respect to the client IHS 202 and/or the docking station 232. The wireless docking management computing module 310 can determine that the presence state indicates that the user 250 is not actively engaged with the client IHS 202 and/or the docking station 232. In response to determining that the first presence state indicates that the user 250 is not actively engaged with the client IHS 202 and/or the docking station 232, the wireless docking management computing module 310 can apply one or more of the additional configuration rules 322 to perform computer-implemented actions of throttling resource utilization at the client IHS 202, at the docking station 232, and/or between the client IHS 202 and the docking station 232. Specifically, the wireless docking management computing module 310 can access the configuration policy 320 and identify the particular configuration rule 322 (or rules 322) that are associated with the determination that the presence state indicates that the user 250 is not actively engaged with the client IHS 202 and/or the docking station 232. The wireless docking management computing module 310 can then apply the particular configuration rule 322 (or rules 322) to perform computer-implemented actions of throttling resource utilization at the client IHS 202, at the docking station 232, and/or between the client IHS 202 and the docking station 232.

Figure 4:
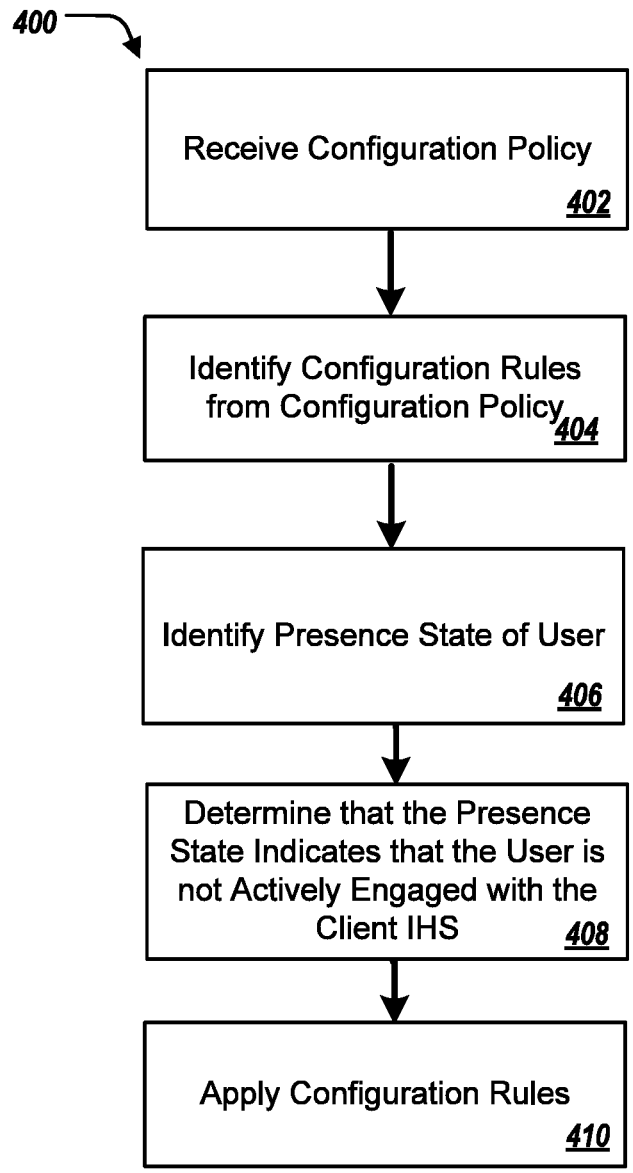
FIG. 4 illustrates a method for adjusting wireless dock usage between the information handling system and a docking station.

FIG. 4 illustrates a flowchart depicting selected elements of an embodiment of a method 400 for adjusting wireless dock usage between an information handling system and a docking station. The method 400 may be performed by the information handling system 100, the information handling system 202, the docking station 232, and/or the wireless docking management computing modules 210, 310 with reference to FIGS. 1-3. It is noted that certain operations described in method 400 may be optional or may be rearranged in different embodiments.

The client IHS 202, and in particular, the wireless docking management computing module 210, receives the configuration policy 220 from the server IHS 230 (402). The client IHS 202, and in particular, the wireless docking management computing module 210, process the configuration policy 220, including identifying configuration rules 222 for performing computer-implemented actions of throttling resource utilization at the client IHS 202, at the docking station 232, and between the client IHS 202 and the docking station 232 (404). The client IHS 202, and in particular, the wireless docking management computing module 210, identifies a presence state of the user 250 with respect to the client IHS 202 when the client IHS 202 is wireless connected to the docking station 232 (406). The client IHS 202, and in particular, the wireless docking management computing module 210, determines that the presence state indicates that the user 250 of the client IHS 202 is not actively engaged with the client IHS 202 (408). In response to determining that the presence state indicates that the user 250 of the client IHS 202 is not actively engaged with the client IHS 202, the client IHS 202, and in particular, the wireless docking management computing module 210, apply the configuration rules 222 to perform computer-implemented actions of throttling resource utilization at the client IHS 202, at the docking station 232, and/or between the client IHS 202 and the docking station 232 (410).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for adjusting wireless docking resource usage, comprising:
    identifying, at a client information handling system (IHS), a configuration policy, the client IHS wirelessly connected to a docking station, the docking station providing one or more wireless connections to one or more peripheral computing components, respectively;
    identifying, at the docking station, an additional configuration policy;
    processing, at the client IHS, the configuration policy, including identifying one or more configuration rules of the configuration policy for performing computer-implemented actions of throttling resource utilization between the client IHS and the docking station;
    processing, at the docking station, the additional configuration policy, including identifying one or more additional configuration rules of the additional configuration policy for performing computer-implemented actions of throttling resource utilization between the client IHS and the docking station;
    identifying, at the client IHS and the docking station, when the client IHS is wirelessly connected to the docking station, a first presence state of a user with respect to the client IHS; and
    determining, at the client IHS and the docking station, that the first presence state indicates that the user of the client IHS is not actively engaged with the client IHS, and in response, applying one or more of the configuration rules and one or more of the additional configuration rules to perform computer-implemented actions of throttling resource utilization between the client IHS and the docking station.

2. The computer-implemented method of claim 1, further comprising:
    identifying, at the client IHS, when the client IHS is wirelessly connected to the docking station, a second presence state of the user with respect to the client IHS; and
    determining, at the client IHS, that the second presence state indicates that the user of the client IHS is actively engaged with the client IHS, and in response, ceasing throttling resource utilization between the client IHS and the docking station.

3. The computer-implemented method of 1, wherein the configuration policy further indicates two or more time thresholds associated with the configuration rules for performing the computer-implemented actions of throttling resource utilization between the client IHS and the docking station,
    wherein identifying, when the client IHS is wirelessly connected to the docking station, the first presence state of the user with respect to the client IHS includes identifying the first presence state of the user with respect to the client IHS for a first time amount,
    the method further comprising:
        comparing the first time amount to a first time threshold of the configuration policy;
        determining that the first time amount is greater than the first time threshold;
        identifying a particular configuration rule of the configuration rules corresponding to i) identification of the first presence state and ii) determining that the first time amount greater than the first time threshold; and
        applying the particular configuration rule including performing a first subset of the computer-implemented actions to throttle resource utilization between the client IHS and the docking station.

4. The computer-implemented method of 1, wherein the configuration policy further indicates two or more location parameters associated with the configuration rules for performing the computer-implemented actions of throttling resource utilization between the client IHS and the docking station,
    wherein identifying, when the client IHS is wirelessly connected to the docking station, the first presence state of the user with respect to the client IHS includes identifying the first presence state of the user with respect to the client IHS at a first location,
    the method further comprising:
        identifying a particular configuration rule of the configuration rules corresponding to i) the identification of the first presence state and ii) the identification of the first location; and
        applying the particular configuration rule including performing a first subset of the computer-implemented actions to throttle resource utilization between the client IHS and the docking station.

5. The computer-implemented method of claim 1, wherein identifying, when the client IHS is wirelessly connected to the docking station, the first presence state of the user with respect to the client IHS includes utilizing an infrared camera to detect the presence of the user.

6. The computer-implemented method of claim 1, wherein identifying, when the client IHS is wirelessly connected to the docking station, the first presence state of the user with respect to the client IHS includes utilizing a camera to detect the presence of the user.

7. The computer-implemented method of claim 1, wherein identifying, when the client IHS is wirelessly connected to the docking station, the first presence state of the user with respect to the client IHS includes utilizing an audio detector to detect the presence of the user.

8. The computer-implemented method of claim 1, further comprising receiving the configuration policy from a server information handling system.

9. The computer-implemented method of claim 1, wherein the configuration rules are further for performing computer-implemented actions of throttling resource utilization at the client IHS and the docking station, the method further comprising applying the one or more of the configuration rules to perform computer-implemented actions of throttling resource utilization at the client IHS and the docking station.

10. The computer-implemented method of claim 9, wherein performing the computer-implemented actions of throttling resource utilization between the client IHS and the docking station includes one or more of reducing wireless traffic between the client IHS and the docking station, changing a power state of a display of the client IHS, and reducing a graphic fidelity of the display of the client IHS.

11. A computing environment, including:
an information handling system comprising a processor having access to memory media storing instructions executable by the processor to perform operations, comprising:
identifying, a configuration policy, the client IHS wirelessly connected to a docking station, the docking station providing one or more wireless connections to one or more peripheral computing components, respectively;
processing the configuration policy, including identifying one or more configuration rules of the configuration policy for performing computer-implemented actions of throttling resource utilization between the client IHS and the docking station;
identifying when the client IHS is wirelessly connected to the docking station, a first presence state of a user with respect to the client IHS; and
determining that the first presence state indicates that the user of the client IHS is not actively engaged with the client IHS, and in response, applying one or more of the configuration rules to perform computer-implemented actions of throttling resource utilization between the client IHS and the docking station,
a docking station comprising a processor having access to memory media storing instructions executable by the processor to perform operations, comprising:
identifying an additional configuration policy;
processing the additional configuration policy, including identifying one or more additional configuration rules of the additional configuration policy for performing computer-implemented actions of throttling resource utilization between the client IHS and the docking station:
identifying when the client IHS is wirelessly connected to the docking station, the first presence state of the user with respect to the IHS; and
determining that the first presence state indicates that the user of the client IHS is not actively engaged with the client IHS, and in response, applying one or more of the additional configuration rules to perform computing-implemented actions of throttling resource utilization between the client IHS and the docking station.

12. The information handling system of claim 11, the operations further comprising:
identifying when the client IHS is wirelessly connected to the docking station, a second presence state of the user with respect to the client IHS; and
determining that the second presence state indicates that the user of the client IHS is actively engaged with the client IHS, and in response, ceasing throttling resource utilization between the client IHS and the docking station.

13. The information handling system of claim 11, wherein the configuration policy further indicates two or more time thresholds associated with the configuration rules for performing the computer-implemented actions of throttling resource utilization between the client IHS and the docking station,
wherein identifying, when the client IHS is wirelessly connected to the docking station, the first presence state of the user with respect to the client IHS includes identifying the first presence state of the user with respect to the client IHS for a first time amount,
the operations further comprising:
comparing the first time amount to a first time threshold of the configuration policy;
determining that the first time amount is greater than the first time threshold;
identifying a particular configuration rule of the configuration rules corresponding to i) identification of the first presence state and ii) determining that the first time amount greater than the first time threshold; and
applying the particular configuration rule including performing a first subset of the computer-implemented actions to throttle resource utilization between the client IHS and the docking station.

14. The information handling system of claim 11, wherein the configuration policy further indicates two or more location parameters associated with the configuration rules for performing the computer-implemented actions of throttling resource utilization between the client IHS and the docking station,
wherein identifying, when the client IHS is wirelessly connected to the docking station, the first presence state of the user with respect to the client IHS includes identifying the first presence state of the user with respect to the client IHS at a first location,
the operations further comprising:
identifying a particular configuration rule of the configuration rules corresponding to i) the identification of the first presence state and ii) the identification of the first location; and
applying the particular configuration rule including performing a first subset of the computer-implemented actions to throttle resource utilization between the client IHS and the docking station.

15. The information handling system of claim 11, the operations further comprising receiving the configuration policy from a server information handling system.

16. The information handling system of claim 11, wherein the configuration rules are further for performing computer-implemented actions of throttling resource utilization at the client IHS, the operations further comprising applying the one or more of the configuration rules to perform computer-implemented actions of throttling resource utilization at the client IHS.

17. The information handling system of claim 16, wherein the operation of performing the computer-implemented actions of throttling resource utilization between the client IHS and the docking station includes one or more of reducing wireless traffic between the client IHS and the docking station, changing a power state of a display of the client IHS, and reducing a graphic fidelity of the display of the client IHS.

18. A non-transitory computer-readable medium storing software comprising instructions executable by one or more computers which, upon such execution, cause the one or more computers to perform operations comprising:

identifying, at a client information handling system (IHS), a configuration policy, the client IHS wirelessly connected to a docking station, the docking station providing one or more wireless connections to one or more peripheral computing components, respectively;

identifying, at the docking station, an additional configuration policy;

processing, at the client IHS, the configuration policy, including identifying one or more configuration rules of the configuration policy for performing computer-implemented actions of throttling resource utilization between the client IHS and the docking station;

processing, at the docking station, the additional configuration policy, including identifying one or more additional configuration rules of the additional configuration policy for performing computer-implemented actions of throttling resource utilization between the client IHS and the docking station;

identifying, at the client IHS and the docking station, when the client IHS is wirelessly connected to the docking station, a first presence state of a user with respect to the client IHS; and determining, at the client IHS and the docking station, that the first presence state indicates that the user of the client IHS is not actively engaged with the client IHS, and in response, applying one or more of the configuration rules and one or more of the additional configuration rules to perform computer-implemented actions of throttling resource utilization between the client IHS and the docking station.

19. The non-transitory computer-readable medium of claim 18, the operations further comprising:

identifying, at the client IHS, when the client IHS is wirelessly connected to the docking station, a second presence state of the user with respect to the client IHS; and determining, at the client IHS, that the second presence state indicates that the user of the client IHS is actively engaged with the client IHS, and in response, ceasing throttling resource utilization between the client IHS and the docking station.

\* \* \* \* \*